(12) United States Patent  
Rodman (10) Patent No.: US 8,767,032 B2
(45) Date of Patent: Jul. 1, 2014

(54) CONFERENCE UNIT CONTROLLING ROOM FUNCTIONS

(75) Inventor: Jeffrey Rodman, San Francisco, CA (US)

(73) Assignee: Polycom, Inc., San Jose, CA (US)

( * ) Notice: Subject to any disclaimer, the term of this patent is extended or adjusted under 35 U.S.C. 154(b) by 1464 days.

(21) Appl. No.: 11/136,138

(22) Filed: May 24, 2005

(65) Prior Publication Data

US 2006/0017805 A1 Jan. 26, 2006

(51) Int. Cl.
*H04N 7/14* (2006.01)

(52) U.S. Cl.
CPC ..................................... *H04N 7/14* (2013.01)
USPC .................. 348/14.02; 348/14.03; 348/14.08; 348/14.09

(58) Field of Classification Search
USPC ........ 348/14.01–14.08; 715/717; 379/102.01, 379/102.02, 102.03
See application file for complete search history.

(56) References Cited

U.S. PATENT DOCUMENTS

| | | | |
|---|---|---|---|
| 5,949,475 A * | 9/1999 | Hatanaka et al. | 348/14.07 |
| 6,044,150 A * | 3/2000 | Rigstad et al. | 379/387.02 |
| 6,288,742 B1 * | 9/2001 | Ansari et al. | 348/211.14 |
| 6,504,480 B1 * | 1/2003 | Magnuson et al. | 340/571 |
| 6,961,637 B2 * | 11/2005 | Scherer | 700/173 |
| 2001/0047441 A1 | 11/2001 | Robertson | |
| 2003/0103075 A1 | 6/2003 | Rosselot | |
| 2003/0224807 A1 * | 12/2003 | Sinha et al. | 455/463 |
| 2004/0178889 A1 * | 9/2004 | Buckingham et al. | 340/328 |
| 2005/0028221 A1 | 2/2005 | Liu et al. | |
| 2005/0231586 A1 | 10/2005 | Rodman | |

FOREIGN PATENT DOCUMENTS

WO 96/41476 A1 12/1996
WO 03049438 6/2003

OTHER PUBLICATIONS

Marasovich et al. ; Method and apparatus for on screen camera control in video-conference equipment; Mar. 31, 1994; WO 94/07327.*
Examiners first report on corresponding Australian application No. 2006202130 dated Dec. 4, 2006.
Japan Patent Office Official Questioning dated Oct. 31, 2011 regarding Japan Application No. 2006-143025.

* cited by examiner

*Primary Examiner* — Melur Ramakrishnaiah
(74) *Attorney, Agent, or Firm* — Wong, Cabello, Lutsch, Rutherford & Brucculeri, L.L.P.

(57) ABSTRACT

Methods and devices for controlling room function devices from a single conference unit. A conference unit can be a video conference unit or a speakerphone. Controlled devices may include external loudspeakers, microphones, room function controllers, powered doors, powered windows, powered window shades or blinders, video screens etc. The connections between devices may be wired, wireless, or a combination of both.

27 Claims, 10 Drawing Sheets

CONFERENCE UNIT CONTROLLING ROOM FUNCTIONS

CROSS-REFERENCE TO RELATED APPLICATIONS

The current application is related to a patent application assigned to the same assignee, Ser. No. 10/897,318, titled "A Conference Link Between a Speakerphone and a Video Conference Unit," filed on Jul. 21, 2004.

The current invention is related to a patent application titled "Conference Endpoint Instructing a Remote Device," Ser. No.11/081,081, filed on Mar. 15, 2005, and applications cited therein.

BACKGROUND OF THE INVENTION

1. Field of the Invention

This invention relates to conference control, including the control of conference equipment and other accessories within a conference room.

2. Description of the Related Art

Teleconferencing has long been an essential tool for communication in business, government and educational institutions. There are many types of teleconferencing equipment based on many characterizations. One type of teleconferencing unit is a videoconferencing unit, which transmits real-time video images as well as real-time audio signals. A video conferencing unit typically comprises a video processing component and an audio processing component. The video processing component may include a camera to pick up live images of conference participants and a video display for showing real-time video images of conference participants or images of documents. The audio portion of a video conferencing unit typically includes one or more microphones to pick up voice signals of conference participants, and loudspeakers to reproduce voices of the participants at the far end. There are many ways to connect video conferencing units. At the low end the link may be an analog plain old telephone service (POTS) line. It may be a digital service line such as an integrated service digital network (ISDN) line or a digital interface to a PBX which may use a T1 or PRI line. More recently video conference units may be linked by digital networks such as an IP network. The operation of the video conference unit is usually controlled by a remote control.

Another type of teleconference unit is a speakerphone, which typically includes at least a loudspeaker and a microphone. Similar to a videoconferencing unit, a speakerphone may also have various connections to another speakerphone. The connection may be an analog POTS line, a digital service line such as an ISDN line or an IP connection. The operation of a speakerphone may be controlled by a remote control, or more typically by a control interface situated on the speakerphone. The control interface may have an alphanumeric keypad and some special buttons for adjusting the operation of the speakerphone.

Within the conference room, there may be other pieces of equipment that cooperate with the videoconference unit or the speakerphone. For example, a computer server may be used to access documents or presentations that are shown during a conference call. A projector may be used in addition to a video monitor of the video conference unit to present a slide show for the local audience. At the beginning of the slide show, a projector screen may need to be lowered to the correct position. The local slide presentation content may be forwarded through the computer and the video conference network to the far ends. An electronic white board may also be used during a conference. The sketches and notes on the white board may be shared with all conference participants wherever the conference units have such capabilities. Typically, each piece of such equipment has its own controller, either through an internal control module or an external remote control.

Furthermore, there are many other pieces of equipment which may also be used during a conference call. For example, a door may need to be closed or locked to prevent unwanted interruption of an on-going conference; the lighting in different parts of the room may need to be adjusted during different parts of the conference; window blinders/shades may need to be brightened or darkened. In a typical conference, someone has to get up and adjust the various components. These actions interrupt the progress of the conference and the train of thought of the group. The interruptions waste valuable time of all conference participants and make the conference longer than necessary.

There are room function controllers that can control some room functions from a central location. For example, a controller may control the thermostat of the air conditioner unit. It may lock or unlock doors and windows. An audio/video controller may control some operations of the audio/video equipment, such as lowering the screen of a video monitor or adjusting the audio volume. But these controllers can only control a few functions that they are designed for. They cannot communicate with other controllers or control other room functions. In a typical conference room, there can be as many as a half dozen controllers for controlling various room functions. It can be very confusing and difficult to know which controller works with which function.

It is desirable to have a method and an apparatus with improved the teleconferencing capabilities to avoid interruptions. It is desirable to manage and control all relevant pieces of equipment of a conference from a centralized location with a simple and intuitive interface.

BRIEF SUMMARY OF THE INVENTION

Using the embodiments of the current invention, most control functions in a conference can be controlled from a single conference unit, for example, a simple speakerphone control interface or its remote control. Using the simple speakerphone control interface or a remote control, one can control the functions of the speakerphone itself, a connected video conference unit, a room controller and other linked devices. The room controller may in turn control all associated room accessories, such doors, windows, blinders, lights, blackboard or whiteboard, pull-down screens etc. Many connection methods, such as a wired HSSB or a wireless link, may be used between some or all components of a conference system.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

Figure 1:
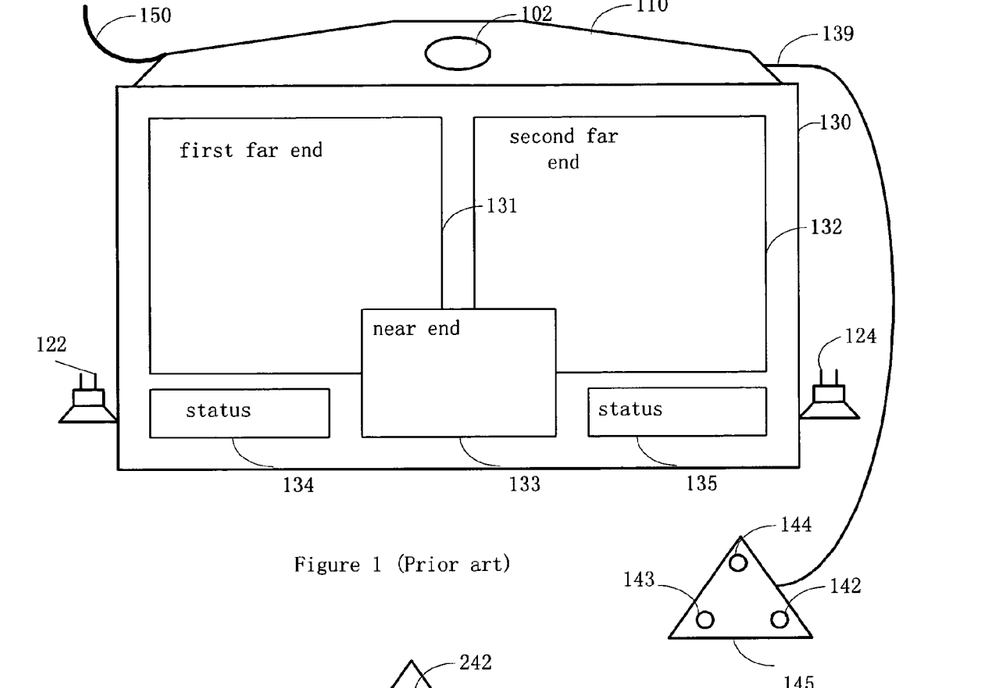
FIG. 1 depicts a typical video conferencing unit in the prior art.
Figure 4:
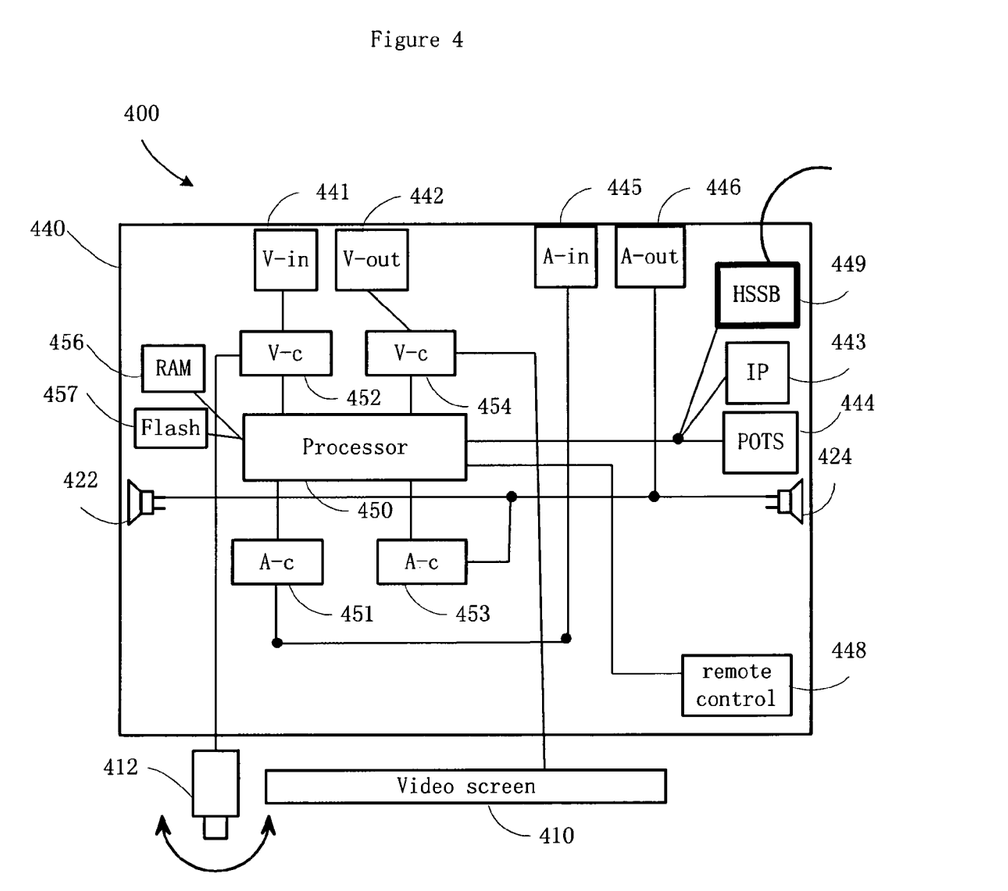
FIG. 4 depicts a block diagram of a video conferencing unit used in the system shown in FIG. 3.

FIG. 1 illustrates a typical video conferencing unit 100 with a video conferencing module 110 and a display screen 130. In this example, the video conferencing module 110 includes a video camera 102. A microphone pod 145 which contains three microphones 142, 143 and 144 is connected to the module 110 via cable 139. There are many other components inside the video conferencing module. A block diagram of a video conference module 110 according to an embodiment of the current invention is shown in FIG. 4. The video conferencing module 110 is connected to a network through cable 150. There are many wires not shown in FIG. 1 that connect the video conferencing module 110 to various networks, including telephone networks or data networks, and to a power supply. The display screen 130 may be a regular TV set or a stand alone video monitor including loudspeakers 122 and 124. Depending on the number of sites of the videoconferencing, the display screen 130 may be divided into smaller windows, such as windows 131 and 132 for showing far end sites, window 133 for showing near end site, and windows 134 and 135 for showing conference status information.

FIG. 4 illustrates a block diagram of a video conference unit 400. The video conference unit 400 has a central module 440, which has internal loudspeakers 422 and 424, a connection to the installed camera 412 and a connection to a display screen 410. The central module 440 has many interfaces for additional video and audio components: video input interface 441, video output interface 442, audio input interface 445 and audio output interface 446. Each interface has connections to multiple audio or video channels. For example, the video input interface 441 can accept video signals from two additional video cameras. The video output interface 442 may output two video channels for up to four monitors. The audio input interface 445 may accept up to twelve microphones, which can be grouped into up to four audio channels. The audio output interface 446 may output five more audio channels. The signal processing and control is performed by the processor unit 450, which is coupled to various audio/video components or interfaces through intermediates 451, 452, 453 and 454. Those intermediates 451-454 perform signal conversions, such as DAC, ADC etc. They are shown as separate blocks, but could be integrated into a single module or an integrated chip. The processor unit 450 is supported by memory module 456 (typically RAM) and mass storage 457 (typically flash memory). Signal processing programs may be stored in the mass storage 457. Components profiles, which may be used in certain situations, can be stored there. The central module 440 has several network interfaces, one interface 443 for a digital network, one special HSSB interface 449 which will be described in more detail below, and another interface 444 for an analog network, typically for connecting with Plain Old Telephone Service (POTS) lines. The interface 444 has at least two POTS lines, one line for each audio channel when a stereo conference is used. The digital interface 443 may support various digital connections, such as ISDN, Ethernet, USB. The ISDN connection is mainly used for a video conference connection through an ISDN network. The Ethernet or LAN connection is mainly used for video conferencing through the Internet or over a LAN. The USB connection may be used to exchange additional audio/video media stream, such as additional cameras, microphones, computers with additional documents etc. A remote control interface 448 is connected to the central module 440. The remote control interface 448 can receive control commands from a handheld remote control (not shown) and transmit the commands to the central module 440 to control the operation of the video conference unit 400. The HSSB interface is one of a variety of interfaces that can link various pieces of equipment used in a conference system. More details about the HSSB and HSSB interface are disclosed in a patent application, Ser. No. 10/897,318, titled "A Conference Link Between a Speakerphone and a Video Conference Unit," filed on Jul. 21, 2004, which is hereby incorporated by reference.

Figure 2:
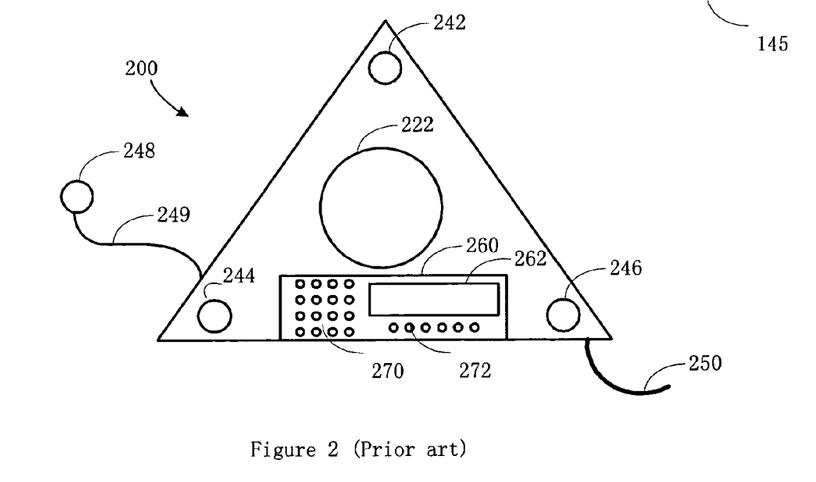
FIG. 2 depicts a speakerphone with satellite microphones in the prior art.

A typical speakerphone is shown in FIG. 2. The speakerphone 200 may contain a loudspeaker 222 and several microphones 242, 244, 246 and 248. Microphones 242, 244 and 246 are embedded in the speakerphone while microphone 248 is a satellite microphone connected to the speakerphone 200 through cable 249. The speakerphone 200 may also include a dial-pad 260 which includes a keypad 270, control buttons 272 and an LCD display 262. A user may control the functionalities of the speakerphone 200 through the keypad 270 and control buttons 272 and get feedback of the operation or status of the speakerphone 200 through the LCD display 262. The speakerphone 200 may connected to a network through connection 250, which can be either a Plain Old Telephone service (POTS) network or an IP network, or both of them. There are many other components or connections not shown in FIG. 2, e.g. a connection to a power source, signal processor in the control module, network interface.

Figure 5:
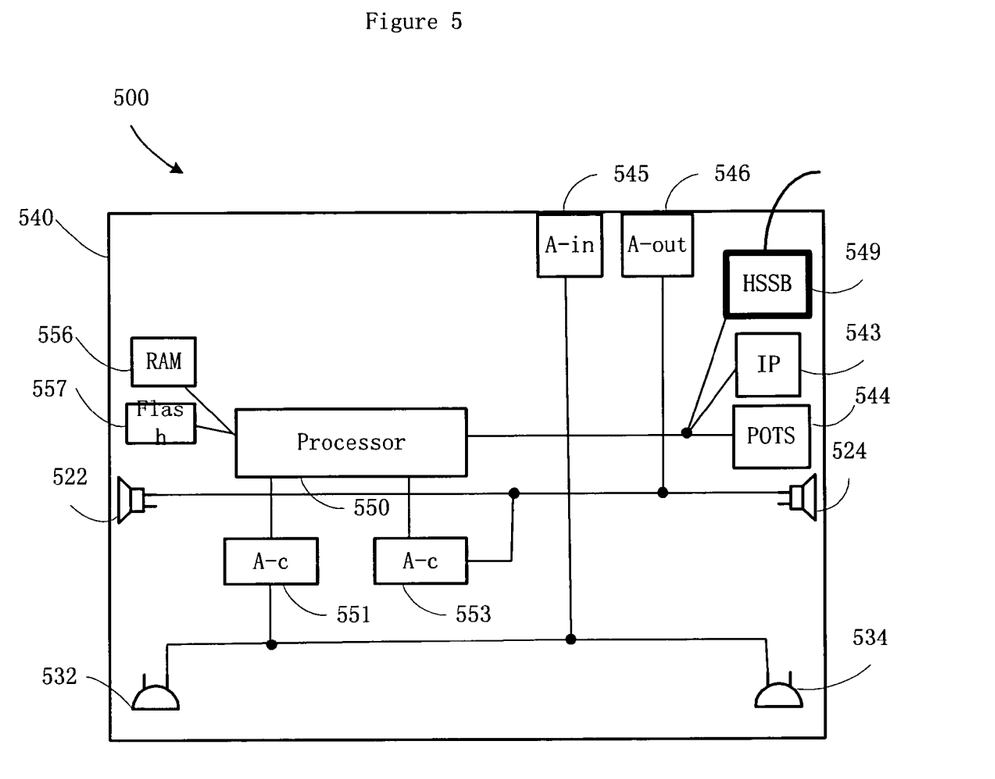
FIG. 5 depicts a block diagram of a speakerphone used in the system shown in FIG. 3.

A block diagram of a speakerphone using HSSB is shown in FIG. 5. It is almost identical to a video conference unit as shown in FIG. 4, except for the omission of video related components. It has a central module 540, which has microphones 532 and 534; loudspeakers 522 and 524, signal converters 551 and 553, audio input interface 545, audio output interface 546, an HSSB interface 549, a digital network interface 543, an analog network interface 544, a memory module 556, a mass storage module 557 and a processor 550.

Figure 3:
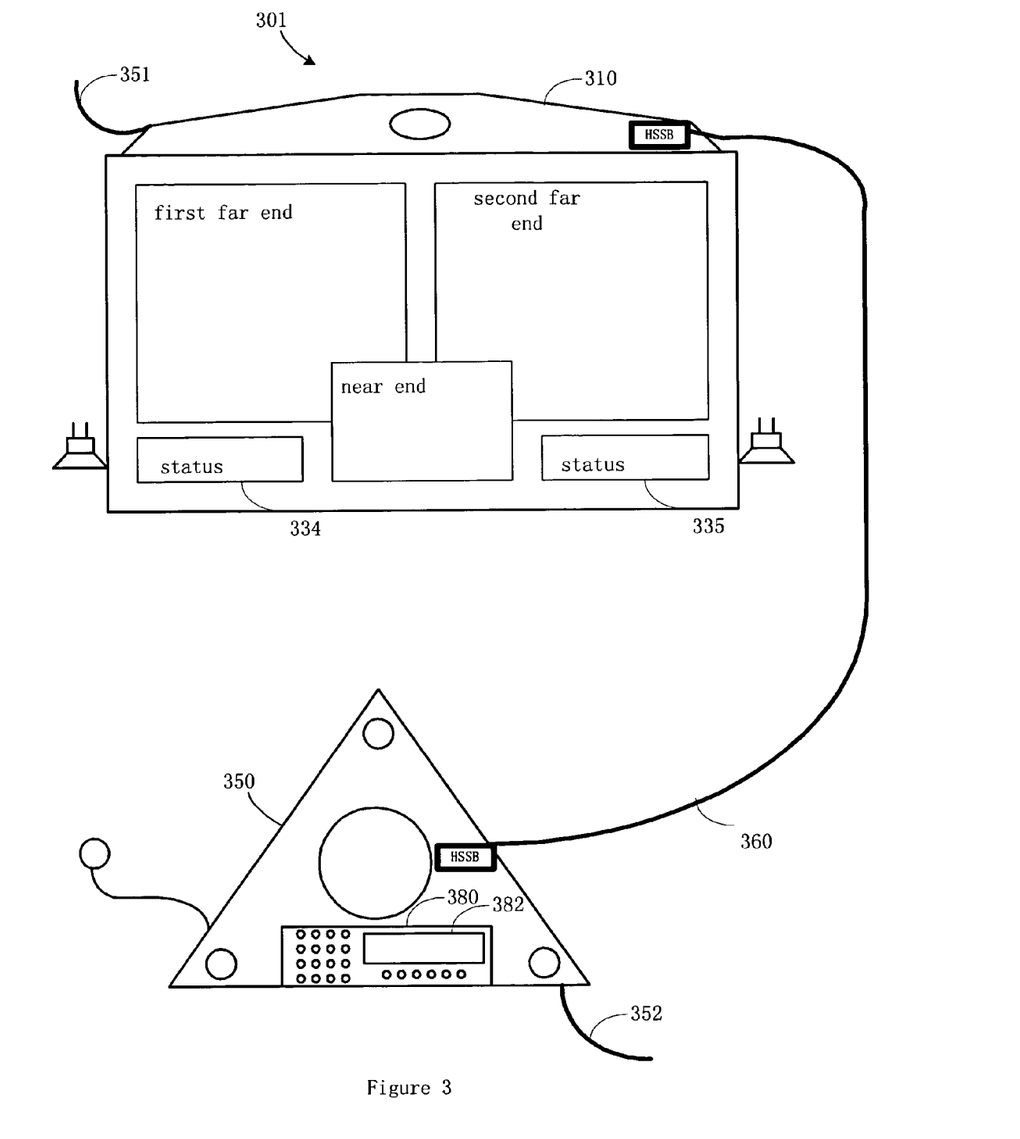
FIG. 3 illustrates a conference link between a video conference unit and a speakerphone according to an embodiment of the current invention.

There are many ways to connect two conference units, such as a speakerphone and a video conference unit. FIG. 3 shows an application of the HSSB, where a link 360 connects the video conference unit 301 and speakerphone 350. This link is called a High-Speed Serial Bus, or a Conference Link. With the link 360, the video conference unit 301 and the speakerphone 350 can work together and share resources. The link 360 is a digital bi-directional link, i.e. each device, the video conference unit 301 or the speakerphone 350 can receive or send data. Other than HSSB, more common wired connections, such as Ethernet or USB may be used.

Figure 6:
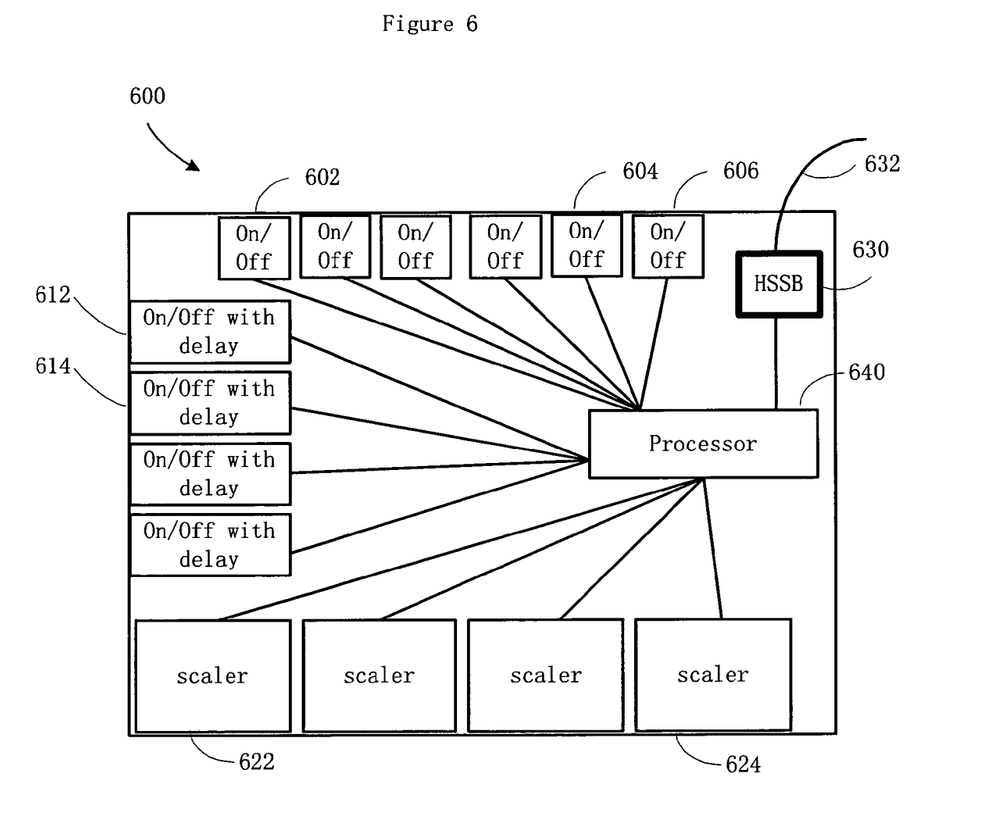
FIG. 6 depicts a block diagram of a room function controller in a conference room having a conference link.

Besides being implemented in a traditional speakerphone or a videoconference unit, a conference link and its associated interface may also be implemented in other equipment or controllers in a conference room. FIG. 6 illustrates one of the controllers that may be used in association with traditional speakerphone or video conference unit in a conference room. The controller 600 as shown in FIG. 6 may be used to control many room function devices within a conference room. A room function device is any device in a conference room that can change the environment of a conference room. A room function device may include, but is not limited to such devices as a heating ventilation and air conditioning system, a door, a window, a window cover (blinder or shade), lights, a retractable video screen, a whiteboard or blackboard. Controller 600 has a processor 640, a conference link interface 630 and a cable 632 that is connected to another component that are capable of using the conference link. Controller 600 can control several types of components, such as on/off switches 602, 604 and 606; on/off switches with delays such as 612 and 614; and scaler controllers 622 and 624 or other controllers necessary for room function devices. The on/off switches, e.g. 602, 604 and 606, can be used to switch a device that may have two modes of operation, such as power switches for light fixtures. These types of equipment can be switched on and off instantly.

There are devices that operate in two modes, but cannot be switched between modes instantly. There is a transition time between the two modes. During the transition time, the device is inoperable. For example, an air conditioning unit may not be operating at the moment it is turned on. It takes some time until the On command takes effect. Similarly, it does not shut off immediately when it is switched Off. To force an immediate action may damage the device. For these types of devices, On/Off switches with delay may be used such that the switches match the characteristics of the controlled devices. The switch with delay prevents the instant On or Off command from being sent to the devices, which may confuse or damage such devices.

For some devices, there may be a range where the devices may operate. For example, a light bulb with a dimmer can output light at varied intensity. It can be better controlled with a scaler controller which takes over the control function of the dimmer. A window blinder or a window shade may also be controlled by a scaler controller, such that the amount of light allowed into a conference room may be adjusted in increments. A retractable video screen may also be controlled by a scaler controller such that the height of the screen may be adjusted.

The controller 600 shown in FIG. 6 has several control elements, for controlling various types of devices. The control elements are typically connected to the controlled devices through wired connections. The control command for each control element is received through the HSSB cable 632 and the HSSB interface 630 from another device, such as a speakerphone or a video conference unit. The command is processed and recognized by the processor 640 and issued to the individual control element to carry out the command.

Figure 7:
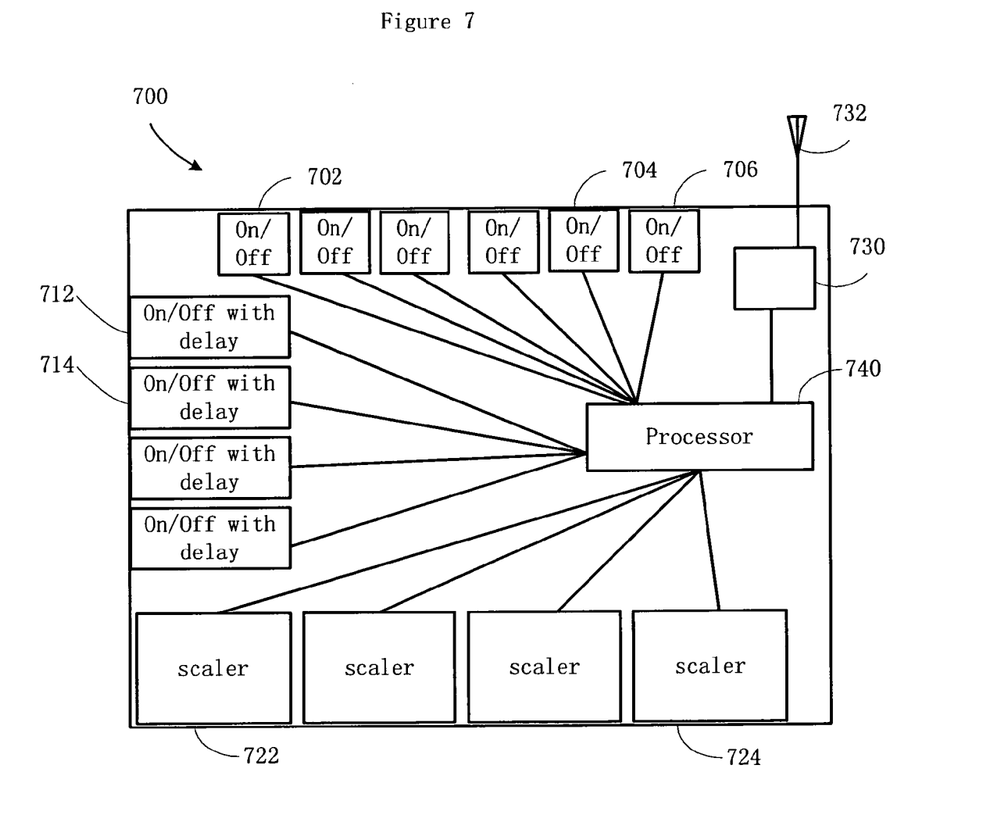
FIG. 7 depicts a block diagram of a similar room function controller as shown in FIG. 6, except that the link is wireless.

In another embodiment of the current invention, a controller 700 as shown in FIG. 7 may use wireless communications to connect with other conference devices. Instead of HSSB as in controller 600, there is an antenna 732 and wireless interface 730. The control commands are received through radio signals and processed by the processor 740. This way, the controller 700 can be placed at a more convenient place to avoid interference with the conference equipment and unsightly wires between the devices can be eliminated. In some embodiments of the current invention, a room controller may be merged into another controller, such as a controller for a video conference unit, as discussed below.

Figure 8:
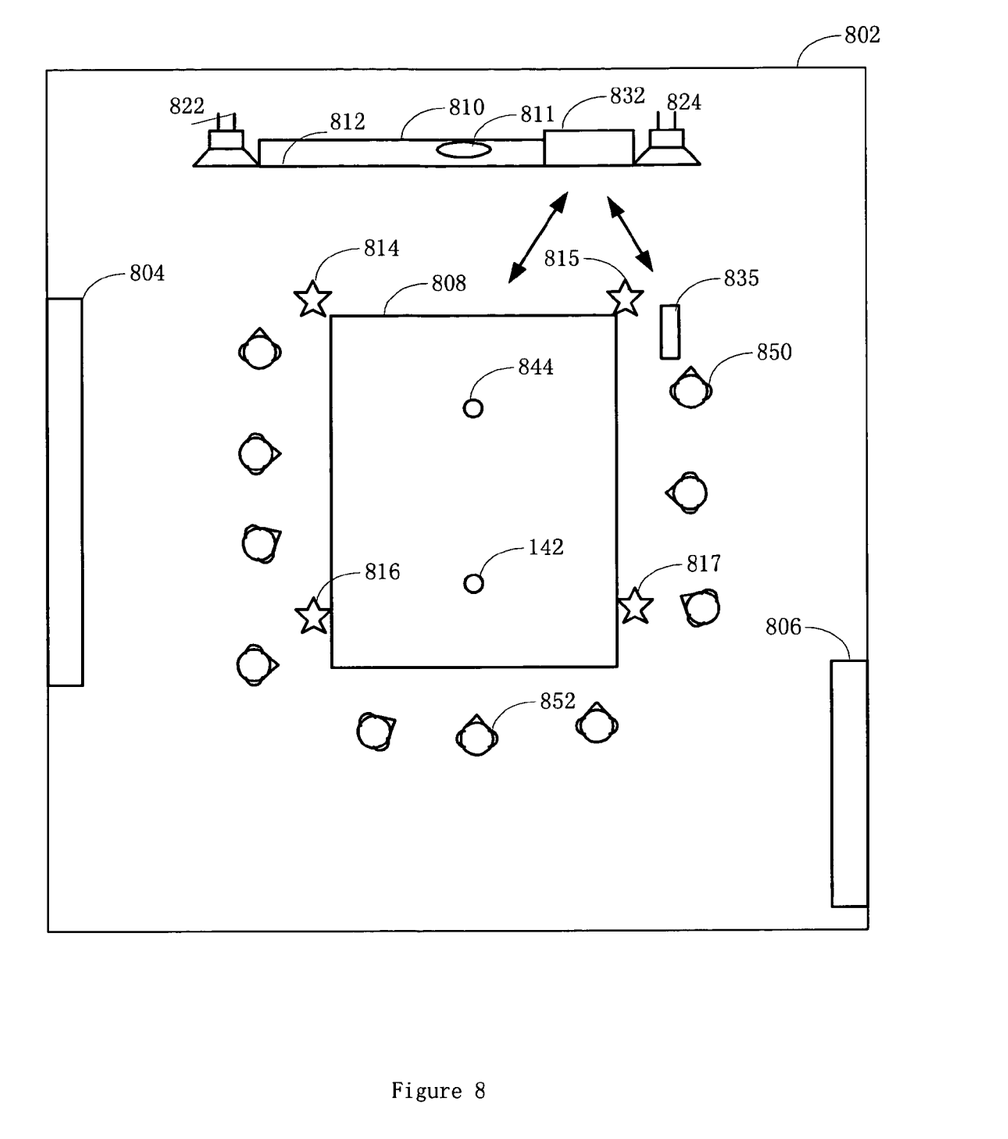
FIG. 8 shows a conference room with several pieces of equipment used in a conference call.

FIG. 8 shows a conference room 802 with conference equipment. The room has a window with window blinder 804 and a door 806. At one side of the room, there is a video conference unit 810, having a video camera 811, a video monitor 812, loudspeakers 822 and 824 and a microphone element (not shown) near the camera. The video conference unit 810 is also connected to a controller 832, which can also function as a room controller similar to the controller shown in FIG. 7. The video conference unit is controlled by a remote control 835, which may be operated by a conference participant 850. There is a conference table 808 in front of the video conference unit 810. On the table 808, there may be some additional microphone modules, such as 842 and 844. These wireless microphone modules are in communication with the video conference unit 810. On the ceiling of the conference room 802, there are lights 814, 815, 816 and 817, all of which are lights with dimmers for adjusting brightness incrementally. These lights are controlled by some control elements in the controller 832. The light dimmers are connected to the controller 832 with wires embedded in the ceiling and side wall near the video conference unit 810. Conference participants, such as 850 and 852, can sit around the table 808 during the conference.

When the conference starts, participant 850 may use the remote control to initiate the conference, i.e. connect to another video conference unit at a far end. He may also darken the window blinder 804 using the same remote control, which sends a command to the video conference unit 810 which in turn relays the command to the controller 832, which in turn adjusts the openness of the blinder 804. Similarly, participant may dim lights 814 and 815 near the video monitor 812 using the remote control 835. He may leave the lights 816 and 817 on or at a brighter level. Once the conference proceeds and all participants have entered the room, he may also lock the door 806 to avoid unwanted interruption by others. All of these control commands are issued through remote control 835, via video conference unit 810 and controller 832. This way, there is no need for someone to get up and perform the controlling acts, which may interrupt the on-going conference. In this example, video conference unit 810 has more control options than a typical video conference unit. These additional options correspond to the extra control elements in controller 832. Remote controller 835 can scroll the list of options which is longer than the list for only the video conference unit. The remote control itself does not need to be modified in anyway.

Figure 9:
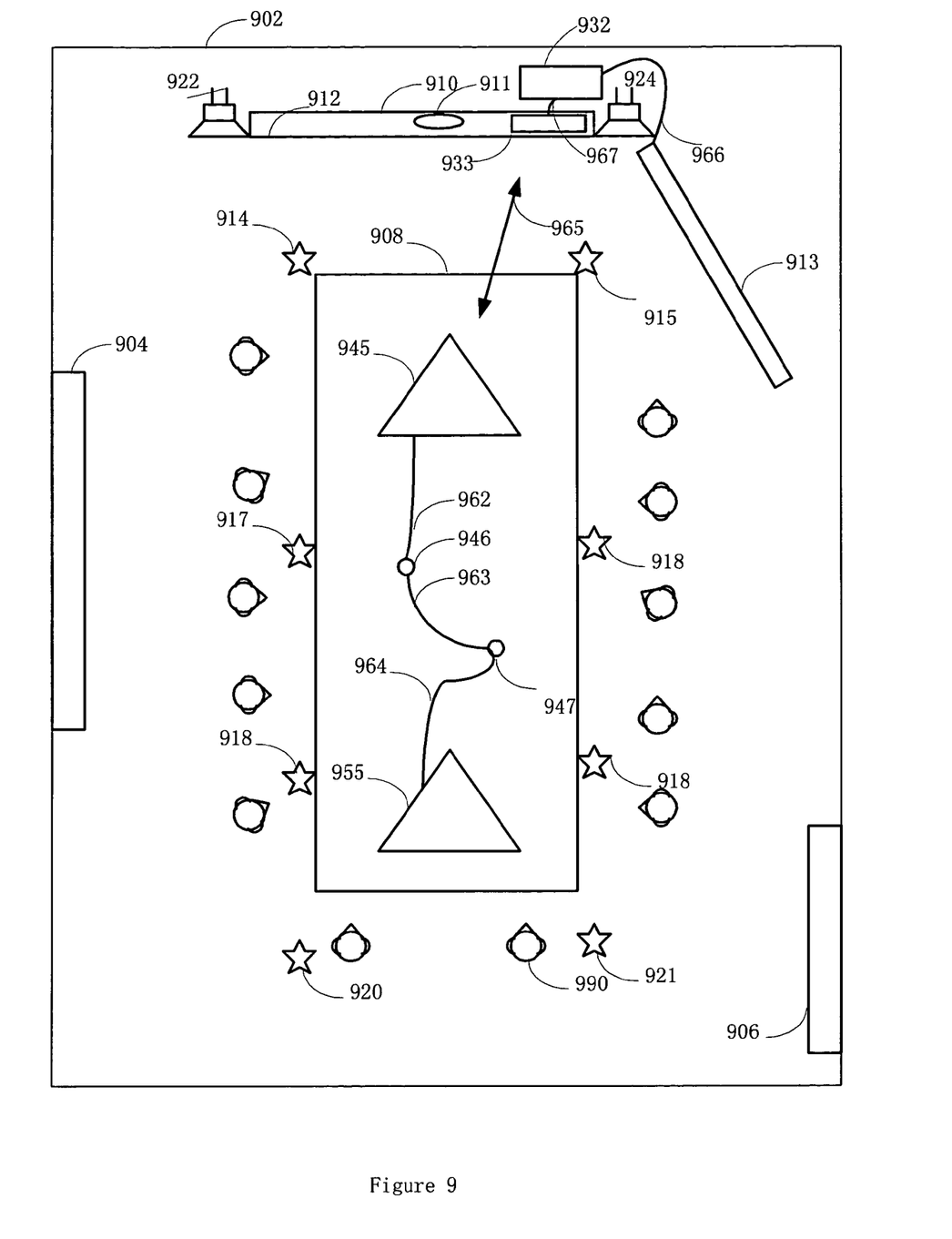
FIG. 9 shows another conference room.

FIG. 9 shows another embodiment of the current invention, where all pieces of equipment can be controlled and managed from a single device. This conference room 902 has a window with an adjustable blinder 904, a door 906, a video conference unit 910, a whiteboard 913, a conference table 908, and chairs that can accommodate conference participants. The video conference unit 910 is placed at one side of the room. The video conference unit 910 has a video camera 911, a video monitor 912, loudspeakers 922 and 924 and a controller 933. The controller 933 of the video conference unit 910 is connected to a room controller 932 via a cable 967. A white board 913 is also connected to the room controller 932 via cable 966. Video conference unit 910 uses external microphones or speakerphones to pickup near end speech.

On the table 908, there are two speakerphones 945 and 955, each of which has loudspeakers and microphone elements. The two speakerphones 945 and 955 are connected with each other and two intermediate microphone modules 946 and 947 with HSSB wires 962, 963 and 964. The independent external microphone modules 946 and 947 provide more speech pickup coverage for the large conference room 902. Conference participants, e.g. 990, can sit around the table 908. The speakerphone 945 is in wireless communication with the video conference unit 910 via controller 933. The wireless link 965 allows the data signals and commands to be transmitted between the linked devices, i.e. speakerphone 945 and video conference unit 910. Similarly, other devices, such speakerphone 955 and whiteboard 913 can also communicate with each other through intermediate devices and the wireless link 965.

The conference room 902 has lights around the room, such as 914, 915, 916, 917 918, 920 and 921, most of which can be adjustable. The lights 914-921, window blinder 904 and door 906 are connected with room controller 932 such that room controller 932 can control the operation of these devices.

Once all connections, wired or wireless, are activated, a conference may be initiated, managed or controlled with one controller of the connected devices. For example, the speakerphone 955 may be used by user 990 to manage the entire conference. Through the control panel on speakerphone 955, user 990 may dial an IP address of a far end conference unit to initiate a video conference call. The IP address is passed from speakerphone 955 through intermediates, such as wire 964, microphone module 947, wire 963, microphone module 962, speakerphone 945, wireless linkage 965 to controller 933 in video conference unit 910, which initiates a request for connection with a far end video conference unit. Once the far end video conference unit accepts the connection request, the video conference can be set up. Still using the control panel on speakerphone 955, commands for other devices controlled by controller 932 can also be sent. For example, the lights 914 and 915 can be dimmed when a command is sent by speakerphone 955. The command is passed through speakerphone 945, wireless link 965, and then to controller 933. Since the command is not for video conference unit 910, controller 933 passes the command to controller 932 which recognizes the command and adjust the corresponding control scalers of the two lights 914 and 915. User 990 may also adjust the loudspeaker volume of the loudspeakers 922 and 924 of the video conference unit 910 via the control panel on speakerphone 955. Any functions of white board 913 may also be controlled by the control panel on speakerphone 955 as if the control panel is the remote control of white board 913. The passage of the control signal is from speakerphone 955, through intermediates to speakerphone 945, via the wireless linkage 965 to controller 933, then to controller 932 via cable 967, and finally to white board 913 via cable 966.

Each controller in the connected devices may conduct automatic power-on testing to check other controllers that are in communication with itself, such that each controller is aware of its surroundings and the network location that it is in. A controller may be made aware of the devices of which it has direct control, e.g. the controller 932 has control over white board 913, lights 914-921, window blinder 904 and door 906, and the devices that it does not control directly, e.g. video conference 910, speakerphones 945 or 955, or microphone modules 946 or 947. This way, each controller can present its control options to a central controller that is used by a user. In the above example, the central controller is the control panel on the speakerphone 955. That way, user 990 can select a particular device from the option list and issue relevant control commands to adjust the operation of such device, without the complicated or lengthy initial configuration. Most of the configuration and modification can be performed by updating the control protocol and controlling software in the controllers in the connected devices, including the video conference units, the speakerphones, the room function controllers and other controllers. This way, existing equipment in a typical conference room may be utilized to their maximum capability.

Figure 10:
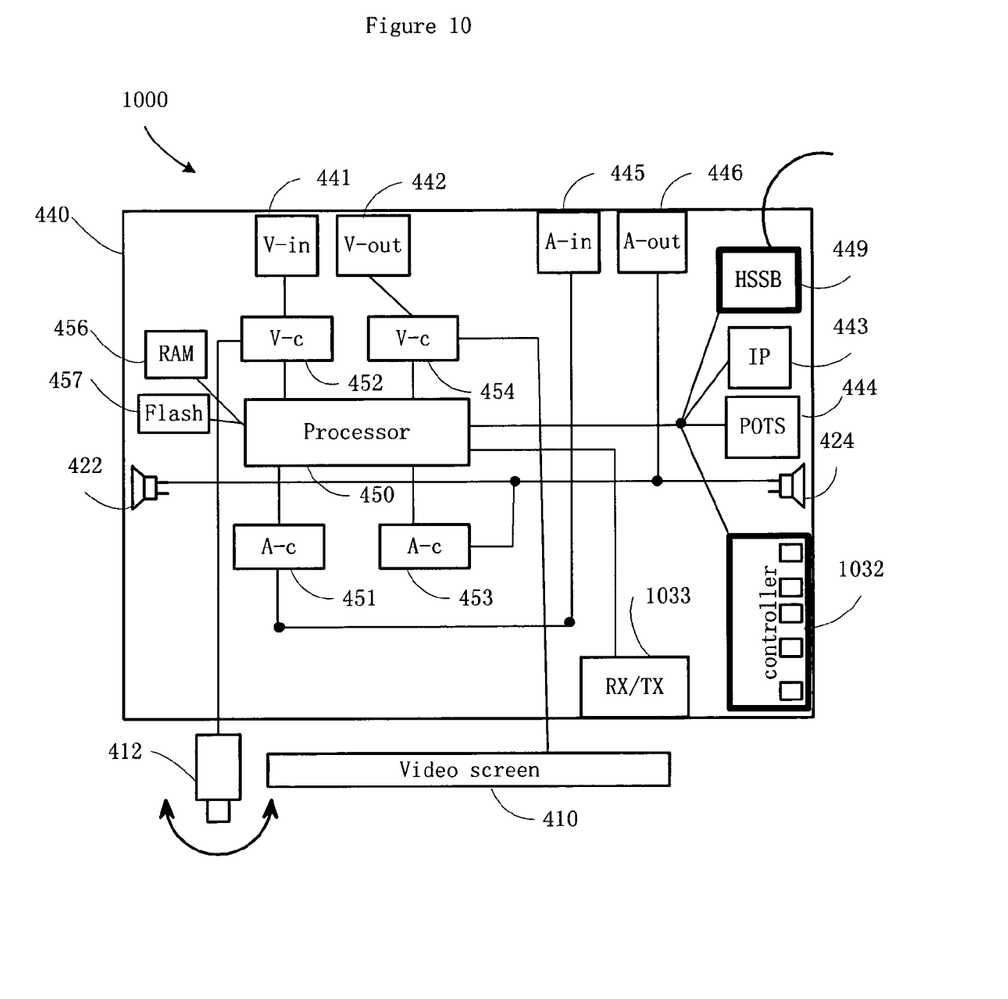
FIG. 10 shows a video conference unit having extra components that enable it to control room functions.

In the embodiments discussed in FIGS. 8 and 9, the room function controller can be an extra controller that is external to the video conference unit or the speakerphone. The room function controller can also be integrated into a video conference unit or a speakerphone with only minor modification of those devices. An example is shown in FIG. 10. The video conference unit 1000 is essentially the same as the video conference unit as shown in FIG. 4, except a couple of minor additions. A group of control elements 1032 are added. These control elements are controlled by the processor 450 of the video conference unit 1000. These control elements 1032 have similar functions to those control elements as shown in FIG. 6 or 7. They can be used to control devices in a conference room, such as window blinders, lights, doors. In addition, the remote control module 448 in video conference unit 400 is expanded to be a transceiver 1033 in video conference unit 1000. The transceiver 1033 can not only accept commands from a remote control, it can also communicate data between other devices in the conference room. Controller 832 used in video conference unit 810 shown in FIG. 8 is one such example. For another example, video conference unit 1000 can be used in the embodiment shown in FIG. 9. With the extra control capability, when video conference unit 1000 is used in the embodiment shown in FIG. 9, the room controller 932 is not needed. All controlled devices can be connected directly to the control elements 1032 in video conference unit 1000.

Figure 11:
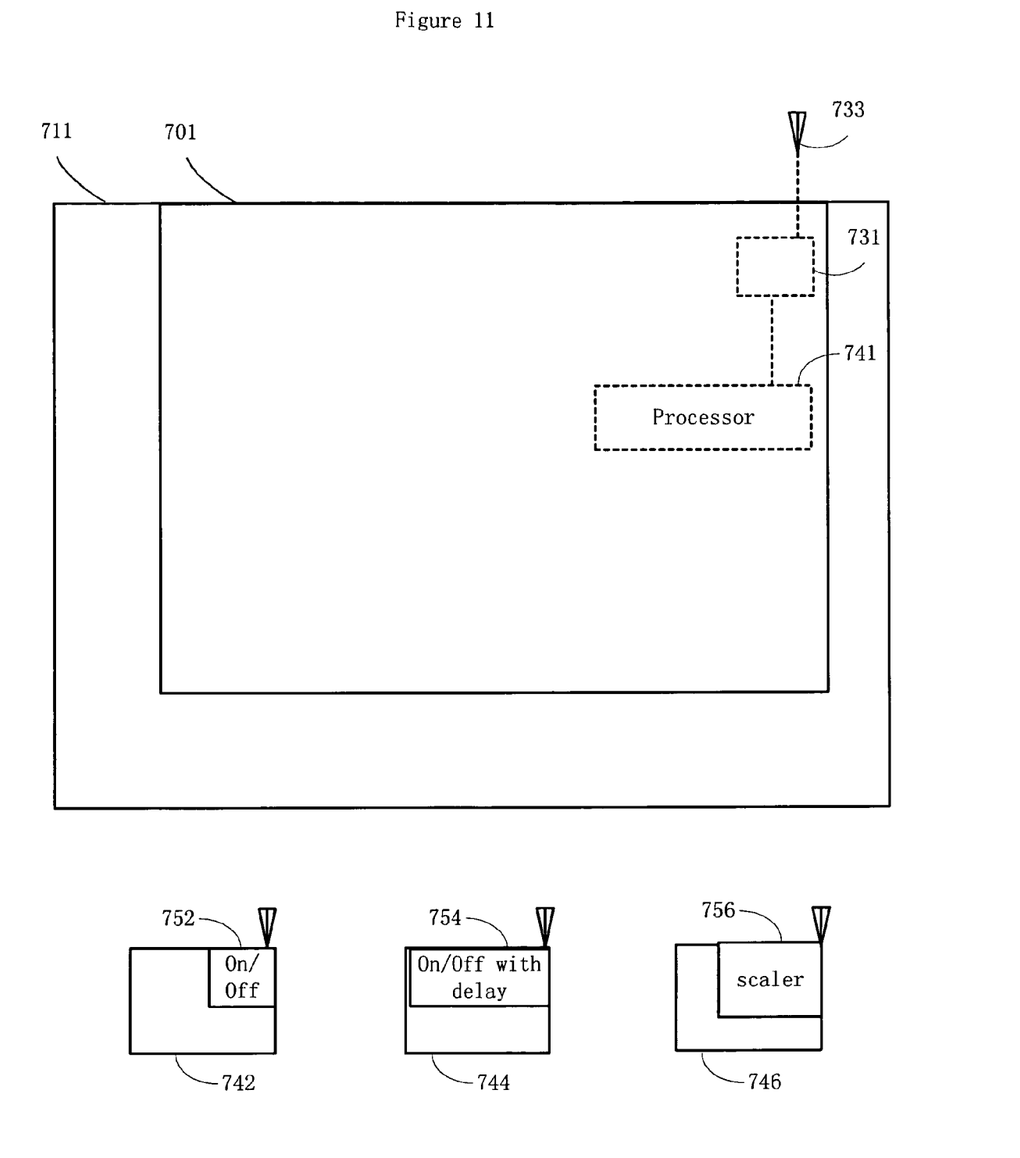
FIG. 11 shows an embodiment that uses wireless linkages between a controller and the controlled devices.

The flexibility and scalability of the embodiments of the current invention can be further improved with wireless linkage between a controller and controlled devices. FIG. 11 shows an example of the wireless communication implementation. The controller 701 is essentially the same as the controller 700 shown in FIG. 7, except that it is now embedded in a device 711. The device 711 can be a speakerphone, a video conference unit or some other kind of devices. The device 711 may have a processor 741, a transceiver 731 and an antenna 733. Therefore, the controller 701 can share the processor 741, transceiver 731 and antenna 733. The controller 701 can control devices 742, 744 and 746 via wireless links to the control elements within those devices, 752, 754 and 756. Since the connection between the controller 701 and a controlled device such as 742, 744 and 746 is wireless, the spatial relationship between the controller and the controlled device is no longer a concern. One does not need to worry about the wiring between the two. One does not need to worry about breaking a wall to access the relevant device. Each controlled device has an embedded control element, e.g. scaler 752, a transceiver and a processor (not shown). Each device may have a unique identifier.

For example, a window blinder 746 with an embedded control element 756 may be controlled by a controller 701 embedded in a cordless speakerphone 701 with no wire attached. The speakerphone can be placed on a conference table. In this example, a user can use the control panel of the speakerphone 711 to adjust the openness of the blinder. The control command is generated by the processor 741 and sent out through the transceiver 731. The control command is received by window blinder 746. Then the control element 756 executes the command to effectuate the command from the user.

When controller 701 sends out a command to a device, the command does not have to be sent from the controller to the controlled device in a unique radio channel. In one embodiment, all commands are received by all controlled devices. The intended device and its control command are matched by their respective identifiers. When the two matches, the intended device will accept such a command, carry out the command and inform controller 701 about its execution. All other controlled devices, wherein the devices and the control commands do not match, can ignored the commands and do nothing. This way, the controller and the controlled devices can use the same type of transceivers and share the same communication channel. The device identifier can be any unique property of the device within a conference room. Some of the convenient identifiers of a device are: its serial number, its IP address if it has one, its unique name assigned by a user during setup or initial configuration and the sequence number when it was connected with other devices.

Any wireless technologies can be used in implementing the embodiments of the current invention. For example, analogy or digital RF technology using 900 MHz or 2.4 GHz frequency band commonly used in cordless telephone may be used. The IEEE 802.11 Wi-Fi technology may be used. The mature digital Wi-Fi technology can provide many functions with very little incremental cost. Bluetooth, which is now widely used in consumer electronic devices, may also be used for communication between devices in the same conference room.

Preferably, the simpler user interface in a speakerphone is used to control all devices in a conference room, e.g. using speakerphone 955 to control all equipment in room 902 as shown in FIG. 9. The control panel on speakerphone 955 has both input keys and an output display. The video display 912 is not used for feedback of control of any devices. In this embodiment, a conference participant may choose a room function from a list of the available room functions on the speakerphone display. The selected command is sent to room function controller 933. Then room controller 933 controls a device to perform the requested room function, for example dimming a light or muting all microphones in the conference room. Thus the operation of room functions during a conference call is centralized and simplified.

The embodiments of the current invention provide methods and devices to link the control of a teleconference system with linked video conference units, speakerphones and other devices, such that all devices may be controlled and managed from a single device. That way, a user does not need to keep several remote controls at hand to control various devices in the conference room. He is not required to know all the keys on all the remote controls just to be able find a correct button for the desired function. He is not required to get up and walk around the room just to adjust some device during a conference, because the need has changed. Overall, the embodiments of the current invention allow the participant in a conference to focus more on the discussion of the meeting, rather than the mechanics of making the meeting happen. The embodiments of the current invention improve and expand functionalities and features of video conference units and speakerphones.

While illustrative embodiments of the invention have been illustrated and described, it will be appreciated that various changes can be made therein without departing from the spirit and scope of the invention.

I claim:

1. A method for combining all control operations during a conference call, the method comprising:
   connecting a room function controller with a link to a conference endpoint;
   connecting the room function controller with a plurality of room function devices;
   transmitting a plurality of control data for controlling the plurality of room function devices from the conference endpoint to the room function controller through the link, wherein each of the control data indicates at least one room function for a room function device;
   sending commands based on the control data from the room function controller to the plurality of room function devices to perform the room functions; and
   performing the room functions by room function devices receiving commands from the room function controller.

2. The method of claim 1, wherein a link is a wired link or a wireless link.

3. The method of claim 2, wherein the wired link is an HSSB link, an Ethernet link, or a USB link.

4. The method of claim 2, wherein the wireless link is an analog RF link, an IEEE 802.11 link, or a Bluetooth link.

5. The method of claim 1,
   wherein the conference unit is a speakerphone or a video conference unit.

6. The method of claim 1, wherein the room function device is a powered door, a powered window blinder, a powered window shade, a powered screen, a projector, a lighting fixture, a heating ventilation and air conditioning unit or a whiteboard.

7. The method of claim 1,
   wherein the control data includes one or more control commands, each command having an identifier indicating the room function device for which the control command is intended; and
   wherein the room function device executes the control commands intended for the room function device and ignores all other control commands.

8. The method of claim 1, further comprising:
   transmitting control data from the conference unit to the room function controller through a wired link; and
   transmitting commands from the room function controller to a room function device through a wireless link.

9. A video conference endpoint operable during a conference call, the video conference endpoint comprising:
   an interface for making a link connecting to a room function controller connected to and controlling a plurality of room function devices; and
   a controller operable to transmit a plurality of control data for controlling the plurality of room function devices to the room function controller through the link;
   wherein each of the control data indicates at least one function to be performed by a room function device controlled by the room function controller.

10. The video conference endpoint of claim 9, wherein the interface is operable to make a wired link or a wireless link.

11. The video conference endpoint of claim 10, wherein the wired link is an HSSB link, an Ethernet link, or a USB link.

12. The video conference endpoint of claim 10, wherein the wireless link is an analog RF link, an IEEE 802.11 link, or a Bluetooth link.

13. The video conference endpoint of claim 9, wherein the room function device is a powered door, a powered window blinder, a powered window shade, a powered screen, a projector, a lighting fixture, a heating ventilation and air conditioning unit or a whiteboard.

14. The video conference endpoint of claim 9,
   wherein the control data includes one or more control commands, each command having an identifier indicating the room function device for which the control command is intended.

15. A speakerphone operable during a conference call, the speakerphone comprising:
   an interface for making a link connecting to a room function controller connected to and controlling a plurality of room function devices; and
   a controller operable to transmit a plurality of control data for controlling the plurality of room function devices to the room function controller through the link;

wherein each of the control data indicates at least one function to be performed by a room function device controlled by the room function controller.

16. The speakerphone of claim 15, wherein the interface is operable to make a wired link or a wireless link.

17. The speakerphone of claim 16, wherein the wired link is an HSSB link, an Ethernet link, or a USB link.

18. The speakerphone of claim 16, wherein the wireless link is an analog RF link, an IEEE 802.11 link, or a Bluetooth link.

19. The speakerphone of claim 15, wherein the room function device is a powered door, a powered window blinder, a powered window shade, a powered screen, a projector, a lighting fixture, a heating ventilation and air conditioning unit or a whiteboard.

20. The speakerphone of claim 15,
wherein the control data includes one or more control commands, each command having an identifier indicating the room function device for which the control command is intended.

21. A conference system for combining all control operations during a conference call, the conference system comprising:
a unit link;
a plurality of device links;
a conference endpoint having:
an interface connected to the unit link; and
a controller operable to transmit a plurality of control data for controlling the plurality of room function devices to a room function controller through the unit link;
a room function controller having:
a unit interface connected to the unit link to receive control data from the conference endpoint; and
a device interface connected to the plurality of device links; and
a plurality of room function devices, each room function device having an interface connected to one of the plurality of device links to receive commands from the room function controller;
wherein each of the control data indicates at least one function to be performed by a room function device controlled by the room function controller; and
wherein each room function device is operable to perform its room function.

22. The conference system of claim 21, wherein a link is a wired link or a wireless link.

23. The conference system of claim 22, wherein the wired link is an HSSB link, an Ethernet link, or a USB link.

24. The conference system of claim 22, wherein the wireless link is an analog RF link, an IEEE 802.11 link, or a Bluetooth link.

25. The conference system of claim 21,
wherein the conference endpoint is a speakerphone or a video conference unit.

26. The conference system of claim 21, wherein the room function device is a powered door, a powered window blinder, a powered window shade, a powered screen, a projector, a lighting fixture, a heating ventilation and air conditioning unit or a whiteboard.

27. The conference system of claim 21,
wherein the control data includes one or more control commands, each command having an identifier indicating the room function device for which the control command is intended; and
wherein the room function device executes the control commands intended for the room function device and ignores all other control commands.

* * * * *